Sept. 9, 1969  M. M. BERNFELD ET AL  3,465,849
ALLIGATOR CLAMP DISC BRAKE
Filed March 15, 1968  2 Sheets-Sheet 1
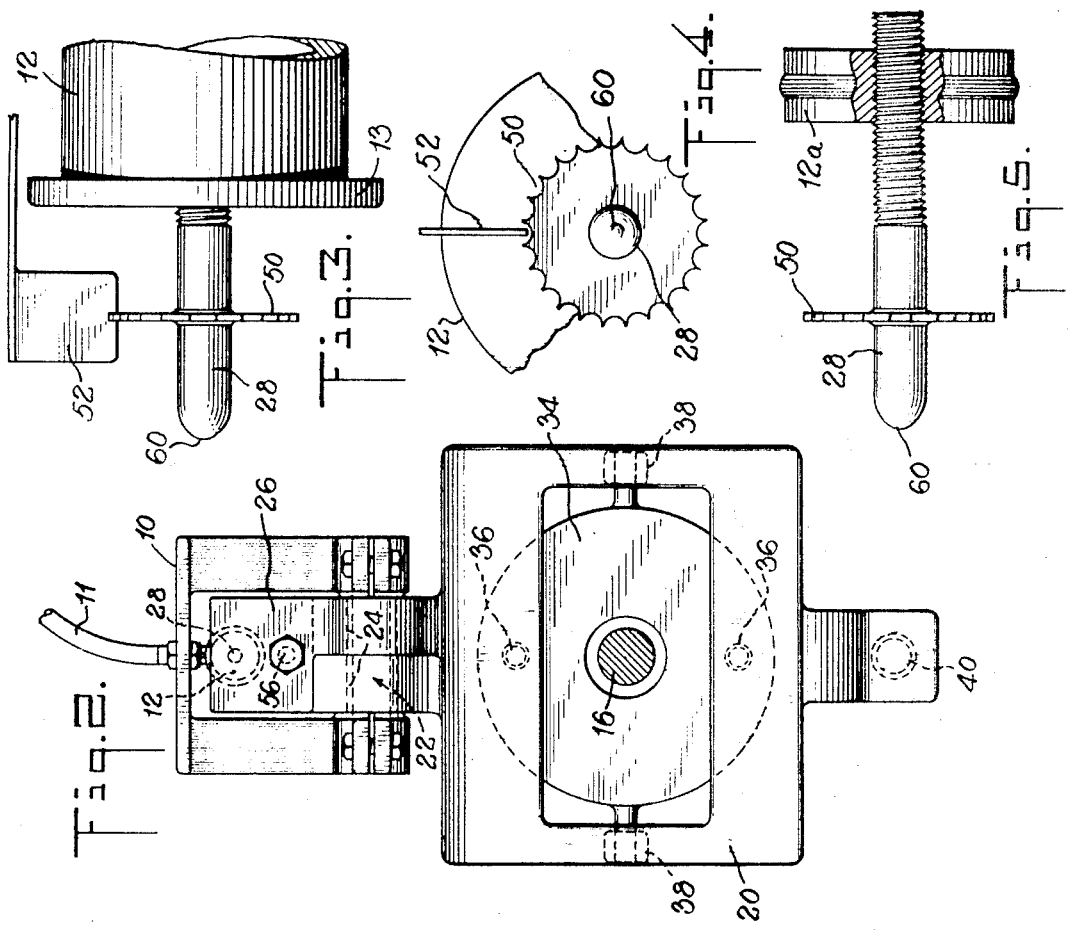
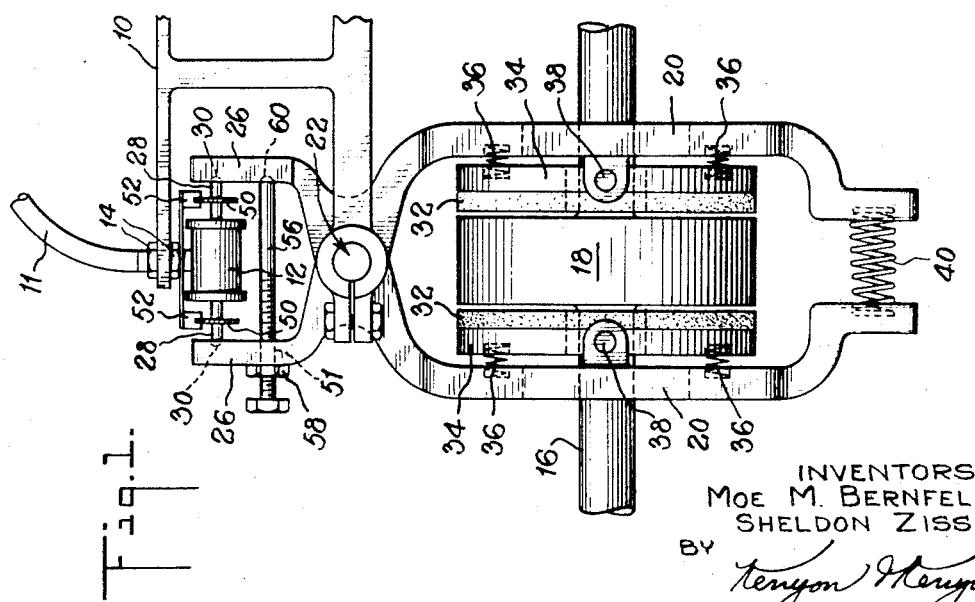
INVENTORS
MOE M. BERNFELD
SHELDON ZISS
BY
Kenyon & Kenyon
ATTORNEYS Sept. 9, 1969  M. M. BERNFELD ET AL  3,465,849
ALLIGATOR CLAMP DISC BRAKE
Filed March 15, 1968  2 Sheets-Sheet 2
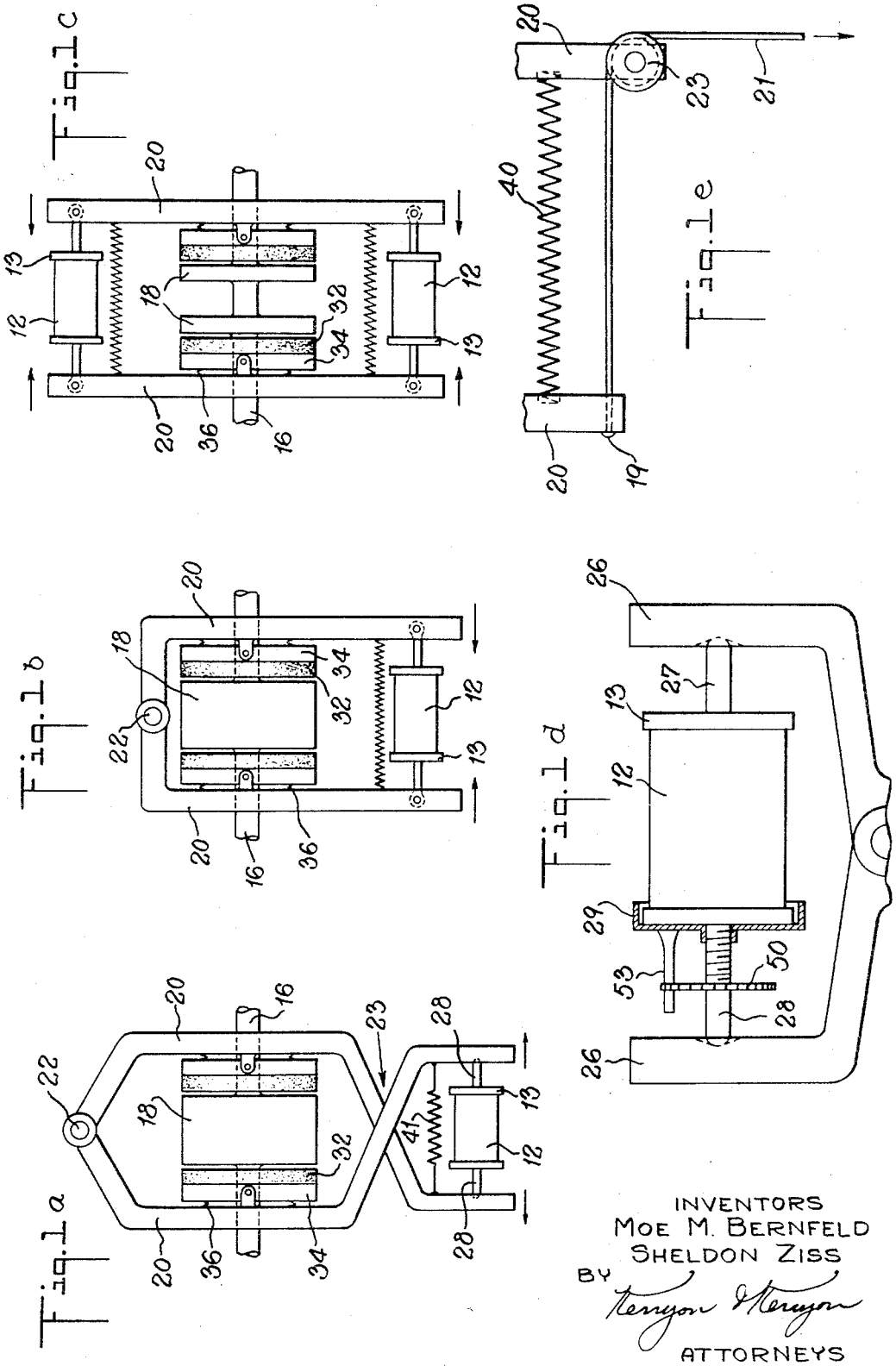
INVENTORS
MOE M. BERNFELD
SHELDON ZISS
BY
Kenyon & Kenyon
ATTORNEYS cd# United States Patent Office 3,465,849
Patented Sept. 9, 1969

3,465,849
ALLIGATOR CLAMP DISC BRAKE
Moe M. Bernfeld, New York, N.Y. (3353 Barker Ave., Bronx, N.Y. 10467), and Sheldon Ziss, New York, N.Y. (2675 W. 36th St., Brooklyn, N.Y. 11218)
Filed Mar. 15, 1968, Ser. No. 713,497
Int. Cl. F16d 65/84, 55/224, 65/44
U.S. Cl. 188—72
12 Claims

ABSTRACT OF THE DISCLOSURE

A disc brake in which two annular discs of friction material are applied to opposite sides of a rotating disc. Each annular pressure plate is mounted upon the inside of a clamp of an alligator type of jaw apparatus. The annular friction discs are applied to the rotating disc by closing the alligator jaw assembly.

Field of invention

This invention relates to and is an improvement upon the general art of caliper type disc brakes, which provide braking force by applying surfaces of friction material to opposite sides of a rotating disc.

Description of prior art

The use of disc brakes in automotive and aircraft applications is well known. In the conventional disc brake braking action is achieved by pressing a pair of small pucks against opposite sides of a rotating disc, by means of a caliper. Each of these pucks bears a piece of lining material having a high co-efficient of friction. The small pucks, with their limited surface area, are subject to rapid wear; this makes necessary either frequent adjustment of the braking system, replacement of the lining material, or the use of spring tension constantly urging the pucks into contact with the rotating disc so as to prevent a large degree of "play" in the braking mechanism, which "play" would cause excessive pedal movement to actuate the brake.

Generally, hydraulic system is used to provide the force to close the calipers and actuate the brake. In prior art caliper brakes, the various components of the hydraulic system, such as cylinders, gaskets, tubing, etc., are necessarily near the pucks and thus near the region of the brake in which a great deal of heat is generated by the braking friction. This has been known to cause various malifunctions in the hydraulic systems. It is difficult to provide for poistive retraction of the puck when the brake is disengaged. Consequently, previous disc brakes cause a "wiping" of the lining material, since the lining material touches the disc even during disengagement of the brake. This produces undesirable "drag" and also tends to wear down the pucks of friction material.

Disc brakes of the prior art require power assists to the hydraulic actuation system in heavy application, due to the fact that the mechanisms of such brakes do not possess a sufficient mechanical advantage at the caliper or pressure points. Even in applications on light vehicles, disc brakes often require expensive power assist devices.

Summary of invention

This invention replaces the small pucks found in conventional disc brakes with large annular discs of friction material, which are pressed against opposite sides of a rotating disc upon which braking action is desired. These annular discs have much greater surface area than do the small pucks and the reduction in thickness of the friction material due to wear proceeds much more slowly than in the prior art type of brake. Furthermore, the energy generated by braking action is distributed over a much larger area. For an equivalent amount of braking energy dissipated, the heat thus derived is released over a larger surface, the temperature of the components of the brake remains lower than in the conventional caliper brake. Since heat is the main cause of brake fade, this enables the disc brake of the present invention to be even more fade resistant than those of the prior art.

Each of the annular friction discs is mounted to the inner side of one jaw of a large alligator clamp device. The brake is actuated by closing the jaws of the alligator clamp upon the rotating disc, forcing the annular friction discs into engagement with the rotating disc.

The opposing jaws of the alligator clamp device overlap or cross at one point, at which point they are fastened together by a bushing and pin assembly which forms a pivot about which the clamps can rotate with respect to each other. Appendages of the alligator clamps extend for some distance beyond the pivot point in a direction away from the rotating disc and annular friction disc assembly. These appendages are configured in such a way that a hydraulic cylinder can be positioned between them. The brake is then actuated by actuating the hydraulic cylinder in such a way that it presses outward from both its ends upon the opposing appendages of the alligator clamp, thus causing the appendages to spread and the clamp to close. Compression springs are provided between the jaws of the alligator clamp, so that, when the hydraulic cylinder is deactuated, the clamp components will separate, thus causing the annular friction discs to disengage from the rotating disc, completely deactuating the brake, and avoiding any residual "drag" of friction material on the rotating disc.

The structure of the alligator clamp device is such that, by varying the length of the appendages between which the hydraulic cylinder is interposed, one can vary, within limits, the mechanical advantage, or leverage, provided by the clamp device.

If the appendages are made longer, the mechanical leverage available to the actuating cylinder is greater. By varying this mechanical advantage appropriately, the use of power assists to the hydraulic system may be obviated in a great number of circumstances.

Also, the positioning of the hydraulic cylinder and the attendant components of the hydraulic system at the end of the said appendages serves to remove the hydraulic system and its components from the immediate region of the brake in which large amounts of heat are generated. This enables the hydraulic system to operate in a generally cooler environment, extending its life and eliminating malfunctions.

It will be seen that this brake is inexpensive and simple to make, having few moving parts. Lubrication can become unnecessary, if nylon or plastic bushings are used. The brake has no enclosures in which damaging heat is allowed to build up; proper ventilation of the components becomes easy.

Adjustment of the disc brake can be provided for. A threaded bolt can be extended through one appendage of the alligator clamp such that it maintains the appendages of the alligator clamps a minimum distance apart, thus

3 assuring that the friction material will not separate more than a desired predetermined distance from the rotating disc.

Objects (1) An object of this invention is to provide a disc brake which is actuated by urging into contact with a rotating disc a pair of substantially annular discs of friction material.

(2) A further object of this invention is to provide a disc brake described in the previous paragraph, the annular friction discs of which are applied to opposite sides of the rotating disc by means of an alligator type clamp device.

(3) A further object of this invention is to provide a disc brake, the linings of which are long lasting and which tend to wear evenly.

(4) Another object of this invention is to provide a clamp-actuated disc brake whose actuating means is positioned sufficiently far from heat generating surfaces of the brake so that it may operate in a relatively cool environment.

(5) Still another object of this invention is to provide a disc brake whose operation is simple, and which is easy to maintain, requiring substantially no lubrication, and which can be made at relatively low expense.

(6) Still another object of this invention is to provide a disc brake in which the heat generated by braking action is dissipated over a relatively large area.

(7) A still further object of this invention is to provide a disc brake in which the need for a power assist to the actuating means is obviated.

(8) A further object of this invention is to provide a disc brake which is easily adjustable to compensate for lining wear.

(9) A still further object of this invention is to provide a disc brake utilizing an alligator clamp means which is provided with means for positively maintaining the friction material in a state of disengagement from the rotating disc whenever actuation signal to the brake is absent.

(10) Other objects of the invention will in part be obvious in view of the following disclosures.

For a fuller understanding of the nature and objects of the invention, reference should be had to the following detailed description taken in connection with the accompanying drawings in which:

FIG. 1 is a front view of the preferred embodiment of this brake.

FIG. 1(a) is an added clamp configuration with pivot at the ends of the clamps.

FIG. 1(b) is an added clamp configuration, with pivot at the ends thereof.

FIG. 1(c) is a clamp configuration using two hydraulic cylinders.

FIG. 1(d) is an adaptation of the invention using a cylinder having only one moving push-rod.

FIG. 1(e) is an adaptation of the invention for use as a parking brake.

FIG. 2 is a side view of the preferred embodiment of this brake.

FIG. 3 is a side view of the portion of a threaded push-rod adjustment means which alters the degree of extension of the push-rod of the hydraulic cylinder used in actuating the brake.

FIG. 4 is a front view of said push-rod adjusting means.

FIG. 5 is a cut-away side view of the said push-rod adjusting means.

Referring now to FIGS. 1 and 2, hydraulic cylinder 12 is firmly attached to support brace 10 by means of bolt and nut 14. Support brace 10 is attached to a suspension member of the individual wheel assembly (steering knuckle, backing plate, etc.) with which the brake is associated. Also attached to brace 10 is a pair of alligator clamp pieces 20 which are superimposed upon one another at region 24. Each alligator clamp piece 20 is provided with a hole in region 24; the clamp pieces are superimposed upon one another in such a way that these holes are aligned, and the clamps are held together by pin and bushing assembly 22 in such a way that they can rotate relative to each other about the center of pin and bushing assembly 22.

Each clamp 20 is configured such that it possesses an appendage 26 which extends beyond the pin and bushing assembly 22 for some distance. Appendages 26 are approximately equal in length, and parallel to one another. Each appendage 26 is provided with a small, roughly spherical indentation 30. Indentations 30 are positioned substantially opposite each other with respect to appendages 26.

Hydraulic cylinder 12 is provided at either end with push-rods 28, which protrude outward from the ends of cylinder 12 through rubber boots 13. When hydraulic cylinder 12 is actuated by means of hydraulic fluid passing through hydraulic line 11, said actuation by any conventional means, great force is applied to push-rods 28, causing them to extend outward from the ends of cylinder 12. Since push-rods 28 are positioned in indentations 30 of appendages 26 of clamps 20, upon actuation, the push-rods will tend to push outward on appendages 26, causing alligator clamps 20 to close with great force.

Solid rotating disc 18 is positioned substantially equally between clamps 20, and is solidly fixed to rotating shaft 16, which is the member upon which braking force is desired.

It is noted that disc 18 can be provided with a plurality of openings, holes, or slots, to facilitate ventilation and rapid cooling of the disc, as shown in FIG. 1(c).

Attached to the inside of each of clamps 20 are annular pressure plates 34. Each pressure plate 34 is fastened to one clamp 20 by two roller bushing assemblies 38. These roller bushing assemblies permit "tilting" of each pressure plate about an axis parallel to that of roller bushing 38. Bushing 38, however, prevents pressure plate 34 from rotating in the axis of rotatable shaft 16.

Attached to the inside surface of each annular pressure plate 34 is a large annular disc of friction material 32, concentric with shaft 16 and rotating disc 18. When friction discs 32 are not engaged with rotating disc 18, pressure plates 34 are held in a position substantially parallel to the sides of clamps 20 by means of compression springs 36.

When cylinder 12 is not actuated, clamps 20 are held separated by compression spring 40 a sufficient distance so that friction discs 32 may not engage rotating disc 18.

It can be seen from the foregoing discussion that, when cylinder 12 is actuated and its push-rods thereby forced outward exerting pressure tending to separate appendages 26, clamps 20, in opposition to compression spring 40, will close, such that friction discs 32 are forced into engagement with rotating disc 18. Because annular discs 32 are firmly attached to annular pressure plates 34, and pressure plates 34 are prevented from rotating by pin and bushing assembly 38, braking force is thereby exerted on rotating disc 18. Since pressure plates 34, and consequently friction discs 32, are free to tilt about the axis of pin and bushing assemblies 38, friction discs 32, on engagement with disc 18, are free to align themselves parallel to the surfaces of the sides of disc 18. This alignment is also aided by compression springs 36. This enables the friction discs to be applied to the rotating disc with substantially equal pressure over the entire surface of friction discs 32.

The fact that the pressure of the friction discs upon the rotating disc is essentially equal throughout the entire surface of the friction disc causes the friction discs to wear relatively evenly. This extends the life of the friction material because it avoids the localization of lining wear.

The mechanical advantage, or leverage, benefiting hydraulic cylinder 12 can be altered, within limits, by varying the lengths of appendages 26. If appendages 26 are made longer, the cylinder possesses more leverage with respect to closure of clamps 20, and therefore more braking force can be applied. This variance of mechanical advantage enables the use of power assists to the hydraulic system of the disc brake to be obviated, in many circumstances.

The presence of compression spring 40 assures that, when hydraulic cylinder 12 is not actuated, clamps 20 are separated sufficiently so that friction discs 32 are not in engagement with rotating disc 18. This in turn assures that the brake will cause no unwanted "drag," or braking force, when no actuation signal is present. The brake will thereby be "self-wiping," i.e., when rotating disc 18 encounters friction material 32, either by manual application of the brakes, or because of expansion of the linings due to excess moisture, excess moisture or impurities on either surface will tend to be removed.

A disclosure of one means for providing adjustment for the alligator clamp disc brake shown in FIGS. 1 and 2 is also shown. Through one of appendages 26 is provided a threaded hole 51, substantially parallel to the axis of hydraulic cylinder 12. Threaded hole 51 is positioned at a point between hydraulic cylinder 12 and bushing and pin assembly 22. Through threaded hole 51 is inserted a long threaded bolt 56. Lock nut 58 is positioned on threaded bolt 56, in engagement with the outside surface of the appendage through which hole 51 is bored. Bolt 56 is sufficiently long that, when it is rotated clockwise, point 60 of bolt 56 will extend parallel to hydraulic cylinder 12 into contact with the appendage directly opposite hole 51. If bolt 56 is sufficiently long, further rotation of the bolt will provide a force tending to separate appendages 26, and will thus exert a closing action on clamps 20.

After considerable operation of this brake, friction material 32 may become somewhat worn and thinner, necessitating excessive lateral movement of the push-rods 28 by hydraulic cylinder 12. This in turn will cause a necessity for greater pedal movement when actuating the brake, and may therefore be undesirable.

If such excessive lining wear occurs, one need merely rotate bolt 56 in a clockwise direction, thus causing a partial closing of clamps 20, until the desired clearance between disc 18 and friction discs 32 is achieved. The brake would then be set in its new adjusted position, and in order to actuate the brake, clamps 20 would have to be moved or closed only a small predetermined distance.

Note that when the brake is adjusted by rotation of bolt 56, the "rest" or open position of the clamps will be such that push-rods 28 may be unable to extend fully into indentations 30. This will necessitate a further adjustment of push-rods 28 such that they may be in firm engagement with indentations 30 when cylinder 12 is in its deactivated state. If this were not provided for, adjustment of the brake by rotation of bolt 56 would not reduce the required pedal movement, since push-rods 28 would have to traverse the distance required to seat them firmly in indentations 30, before the brake itself could begin to actuate.

The adjustment of these push-rods is provided as is shown in FIGS. 3, 4 and 5. Each push-rod 28 is threaded on its inner end and screwed into a threaded fitting on its associated piston 12a of cylinder 12. Thus, by rotating push-rod 28, the degree of its extension from the ends of cylinder 12 can be varied. Over each push-rod 28 is fitted serrated wheel disc 50, which is firmly fixed to push-rod 28. Yieldable spring steel blades 52 are fixed to the outside surface of the housing of cylinder 12. The spring steel blades extend outward from rubber boots 13, substantially parallel to push-rods 28 for a sufficient distance down the length of push-rods 28 such that the ends of blades 52 will engage the teeth of serrated wheel discs 50. The degree to which push-rods 28 extend from the ends of cylinder 12 can be varied by simply rotating threaded push-rod 28 a desired amount by means of wheel disc 50. Push-rods 28 are firmly held in the desired rotational position by the engagement of the ends of steel blades 52 in the teeth of wheels 50. Blades 52, being yieldable, at the same time permit rotational movement of push rods 28 when desired, by means of "clicking" the teeth of each serrated wheel 50 under the end of spring steel blades 52.

It will thus be seen that the objects set forth above, among those made apparent from the preceding description, are efficiently attained, and since certain changes can be made in the above constructions without departing from the scope of the invention, it is intended that all matter contained in the above description be interpreted as illustrative, and not in a limiting sense. For example, the mechanical configuration of clamps 20 and pivot 22 can be varied, as shown in FIGS. 1(a)–1(c).

In FIG. 1(a), pivot 22 is located at the ends of clamps 20. Clamps 20 cross, but are not joined, at region 23. Spring 41 and cylinder 12 are located, as shown, beyond the point of crossing.

FIG. 1(b) shows a similar configuration, but clamps 20 do not cross, and cylinder 12 actuates the brake by pulling together the ends of clamps 20, rather than pushing them apart.

In FIG. 1(c), clamps 20 are parallel and not joined at any point; two cylinders, both pulling clamps 20 together on actuation, are used.

FIG. 1(d) shows the adaption of a single push-rod type of cylinder to the present invention. Cylinder 12 is provided at one end with fixed rod 27, and at the other with movable push-rod 28. Push-rod 28 is threaded, and a heavy steel washer 29, also threaded, is screwed onto it. Washer 29 is sufficiently large that it prevents push-rod 28 from retracting into cylinder 12 by engaging the outer housing of cylinder 12. Long threaded bolt 56 may be dispensed with by this arrangement; the cylinder 12 assembly so constructed serving in its place.

The degree of extension of push-rod 28 from cylinder 12, when the brake is in its deactuated state, is governed by the degree of relative rotation between washer 29 and push-rod 28. Washer 29 is provided with a spring steel blade 53, which engages a serrated wheel 50, fixed to rod 28, to maintain the above-mentioned desired degree of relative rotation.

The invention can also be adapted, as shown in FIG. 1(e) for use as a parking brake, controlled by a foot pedal or hand lever. The lower end of one clamp 20 is provided with a small hole, through which cable 21 is laced. Cable 21 has attached to one end small knob 19, which, because of its size, prevents the end of cable 21 from passing through the hole in clamp 20. The opposite clamp is provided with pulley 23, over which cable 21 runs. Cable 21 is attached mechanically to a lever or foot pedal having a ratchet. Moving the pedal or lever causes tension on cable 21 and the brake is drawn up to its locked position until released. In one preferable embodiment cable 21 leaves pulley 23 in a line which passes through the pivot point 22 so as to minimize torsional forces on the brake assembly and its mounting.

What is claimed:
1. A disc brake for an axle member comprising:
 (a) a rotatable disc adapted to be attached to an axle member upon which braking force is to be exerted, said rotatable disc having oppositely disposed faces,
 (b) an alligator clamp including two elongated opposing clamping members each disposed adjacent a different one of said opposite faces of said rotatable disc, said clamping members each having the length thereof disposed substantially along a diameter of said rotatable disc,
 (c) means adapted to be fixedly supported with respect to the axle for articulating said clamping members with respect to one another at a predetermined location on each thereof, said articulating means being disposed radially beyond the outside diameter of said rotatable disc,
 (d) annular brake discs each having a centrally disposed opening through which the axle is adapted to extend, each of said brake discs being pivotally mounted on a different one of said alligator clamping members with a surface thereof in a facing relationship and adapted to engage with a different opposite face of said rotatable disc, the pivotal axis of each of said brake discs extending substantially perpendicular to both the length of said clamping member related thereto and the longitudinal axis of the axle, (e) means for resiliently biasing each of said brake discs with respect to said clamping member associated therewith, to maintain the surface of said brake disc substantially parallel to the face of said rotatable disc adjacent thereto, when said brake discs are out of contact with said rotatable disc, (f) means fixedly positioned between adjacent end portions of said clamping members outside the radius of said rotatable disc for selectively actuating said clamping members to force said brake discs toward the opposite faces of said rotatable disc, and (g) means attached to said clamping members for resiliently urging said clamping members in a predetermined direction which causes said brake discs to to be urged away from the faces of said rotatable disc.

2. An apparatus in accordance with claim 1, in which said means for articulating said clamping members with respect to one another at a predetermined location thereof comprises said clamping members being superimposed at a point intermediate along their respective lengths and pivotally joined by pivot means at said point of superposition, said pivot means being fixedly supported with respect to said axle, said clamping members possessing appendages which extend beyond said pivot means in a direction away from said rotatable disc.

3. An apparatus in accordance with claim 1, in which said means for articulating said clamping members with respect to one another and in which said means for selectively actuating said clamping members comprises an actuator disposed between said clamping members adjacent each of the opposite corresponding ends thereof for selectively moving said clamping members toward the opposite sides of said rotatable disc.

4. An apparatus in accordance with claim 1 in which said means for selectively actuating said clamping members comprises:

(a) an hydraulic cylinder, having a piston disposed therein, (b) a member fixed with respect to said cylinder, said fixed member adapted to engage one of said clamping members, (c) a movable threaded pushrod attached to said piston adapted to engage the opposite said clamping member, a threaded washer whose diameter is greater than that of the opening of the housing of said cylinder at the pushrod end screwed onto said threaded pushrod, such that the position of said pushrod on deactuation of said cylinder may be adjusted by rotating said washer with respect to said pushrod, and (d) stop screw means threadedly engaged with respect to one of said clamping members and extending toward the other of said clamping members and adapted to engage said other clamping member for determining the spacing between said clamping members when said cylinder is in a deactuated state.

5. An apparatus in accordance with claim 1 and further comprising a cable attached to one of said clamping members, a pulley attached to the other of said clamping members, said cable passing over said pulley, and means connected to said cable for applying tension thereto to actuate said brake.

6. An apparatus in accordance with claim 1, in which said rotatable disc is circumferentially relieved between the opposite faces thereof to increase the heat transfer of said rotatable disc.

7. An apparatus in accordance with claim 1, in which said clamping members are pivotally attached to one another by a pivot means at a location adjacent to the ends of said clamping members.

8. An apparatus in accordance with claim 7, in which said clamping members cross free of one another at a point intermediate on the length of each of said clamping members.

9. A disc brake for an axle member comprising:

(a) a support fixedly positioned with respect to said axle member for supporting said brake, (b) a rotatable disc adapted to be attached to the axle member upon which braking force is to be exerted, said rotatable disc having oppositely disposed faces, (c) an alligator clamp including two elongated opposing clamping members each disposed adjacent a different one of said opposite faces of said rotatable disc, said clamping members each having the length thereof disposed substantially along a diameter of said rotatable disc, said clamping members being superimposed upon one another at a location intermediate along the lengths of the said clamping members, said clamping members being pivotally mounted by pivot means to said support brace at said location of superposition, (d) each of said clamping members possessing an appendage extending beyond said pivot means in a direction generally away from said rotating disc, (e) annular brake discs, each having a centrally disposed opening through which said axle member is adapted to extend, each of said brake friction discs being pivotally mounted on a different one of said alligator clamping members with a surface thereof in a facing relationship and adapted to engage with a different opposite face of said rotatable disc, the pivotal axis of each of said brake friction discs extending substantially perpendicular to both the length of said clamping member related thereto and the longitudinal axis of the axle, (f) means for resiliently biasing each of said brake discs with respect to said clamping member associated therewith to maintain the surface of said brake disc substantially parallel to the face of said rotatable disc adjacent thereto when said brake discs are out of contact with said rotatable disc, (g) hydraulic cylinder power means fixedly positioned between adjacent end portions of said appendages for engaging and selectively actuating said clamping members with respect to one another to force said brake friction discs toward the opposite faces of said rotatable disc, and (h) means attached to said clamping members for resiliently urging said clamping members in a predetermined direction which causes said brake discs to be urged away from the faces of said rotatable disc.

10. An apparatus in accordance with claim 9 in which said means for selectively actuating said clamping members comprises:

(a) an hydraulic cylinder, having a piston disposed therein, (b) a member fixed with respect to said cylinder, said fixed member adapted to engage one of said clamping members, (c) a movable threaded pushrod attached to said piston, adapted to engage the opposite said clamping member, a threaded washer whose diameter is greater than that of the opening of the housing of said cylinder at the pushrod end screwed onto said threaded pushrod, such that the position of said pushrod on deactuation of said cylinder may be adjacent by rotating said washer with respect to said pushrod, (d) a serrated wheel concentrically fixed to said threaded pushrod, (e) a yieldable blade fixedly mounted with respect to said cylinder, adapted to engage the serrations of said serrated wheel, and (f) stop screw means threadedly engaged with respect to one of said clamping members and extending toward the other of said clamping members and adapted to engage said other clamping member for determining the spacing between said clamping members when said cylinder is in a deactuated state.

11. An apparatus in accordance with claim 10 and further comprising a cable attached to one of said clamping members, a pulley attached to the other of said clamping members, said cable passing over said pulley, and means connected to said cable for applying tension thereto to actuate said brake.

12. An apparatus in accordance with claim 10, in which said rotatable disc is circumferentially relieved between the opposite faces thereof to increase the heat transfer of said rotatable disc.

References Cited

UNITED STATES PATENTS

| | | |
|---|---|---|
| 2,037,432 | 4/1936 | Oliver. |
| 2,334,169 | 11/1943 | Aurien. |
| 2,586,518 | 2/1952 | Collier _____ 188—72 |
| 2,827,132 | 3/1958 | Buyze _____ 188—73 |
| 3,198,292 | 8/1965 | Brueder _____ 188—73 |
| 3,209,866 | 10/1965 | Ullrich. |
| 3,219,153 | 11/1965 | Cadiou _____ 188—73 |

FOREIGN PATENTS 30,070  7/1964  Germany.

OTHER REFERENCES

German printed application 1,017,034, October 1947.

GEORGE E. A. HALVOSA, Primary Examiner

U.S. Cl. X.R.

188—106, 196; 192—70.28, .29, .25, .3

UNITED STATES PATENT OFFICE
CERTIFICATE OF CORRECTION

Patent No. 3,465,849                       September 9, 1969

Moe M. Bernfeld et al.

It is certified that error appears in the above identified patent and that said Letters Patent are hereby corrected as shown below:

Column 1, line 42, after "Generally" insert -- a --.
Column 7, line 35, "means for articulating said clamping members" should read -- clamping members extend substantially parallel --. Column 8, line 67, "adjacent" should read -- adjusted --.

Signed and sealed this 20th day of January 1970.

(SEAL)
Attest:

Edward M. Fletcher, Jr.                    WILLIAM E. SCHUYLER, JR.
Attesting Officer                          Commissioner of Patents